May 31, 1960 G. E. CARPENTER ET AL 2,938,450
OUTDOOR COOKING APPARATUS
Filed April 12, 1955 3 Sheets-Sheet 1
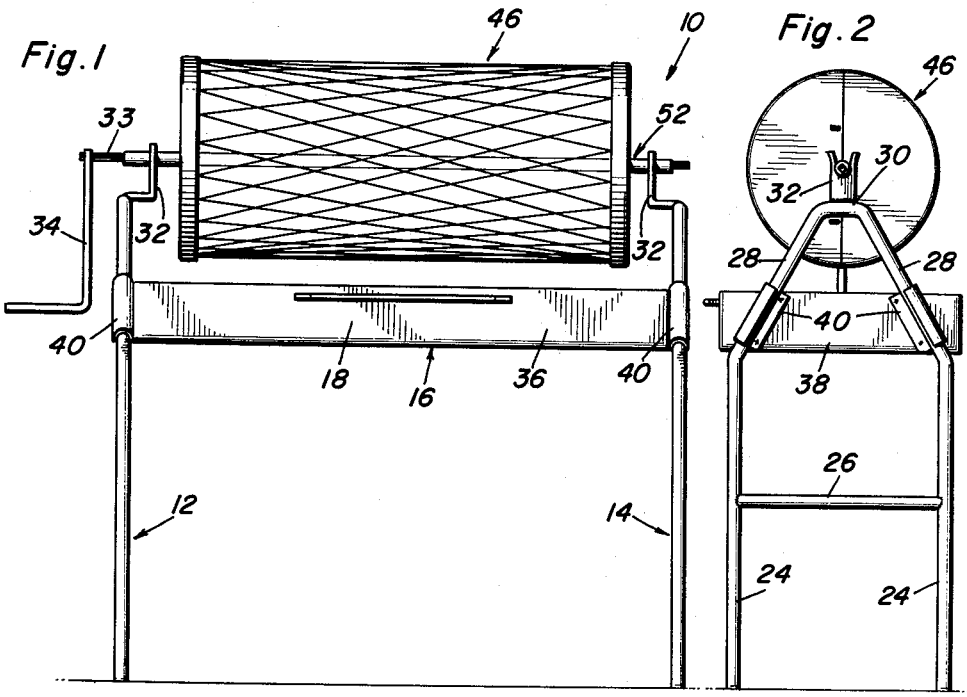
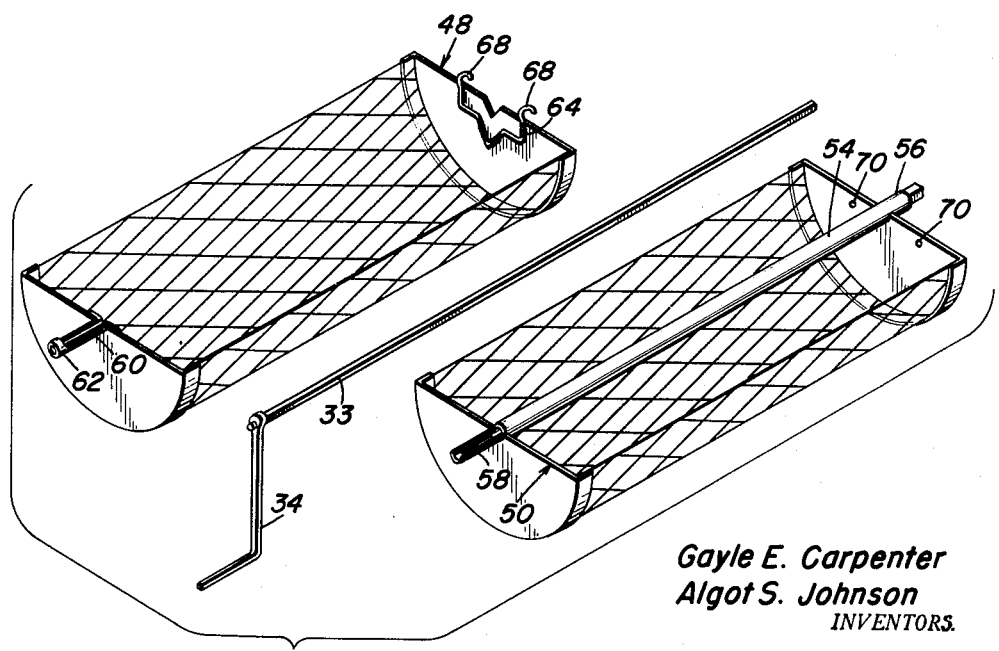
Gayle E. Carpenter
Algot S. Johnson
INVENTORS.

May 31, 1960   G. E. CARPENTER ET AL   2,938,450
OUTDOOR COOKING APPARATUS
Filed April 12, 1955   3 Sheets-Sheet 2
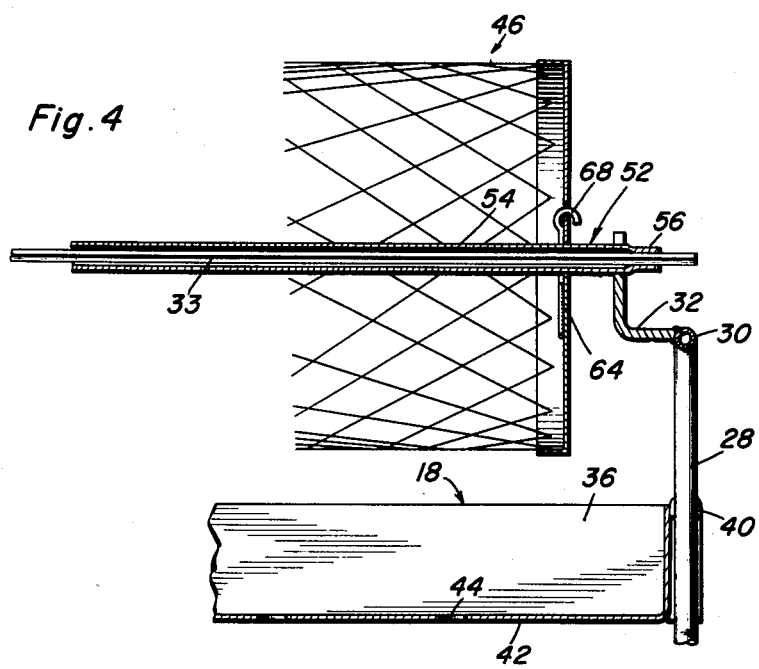
Fig. 4
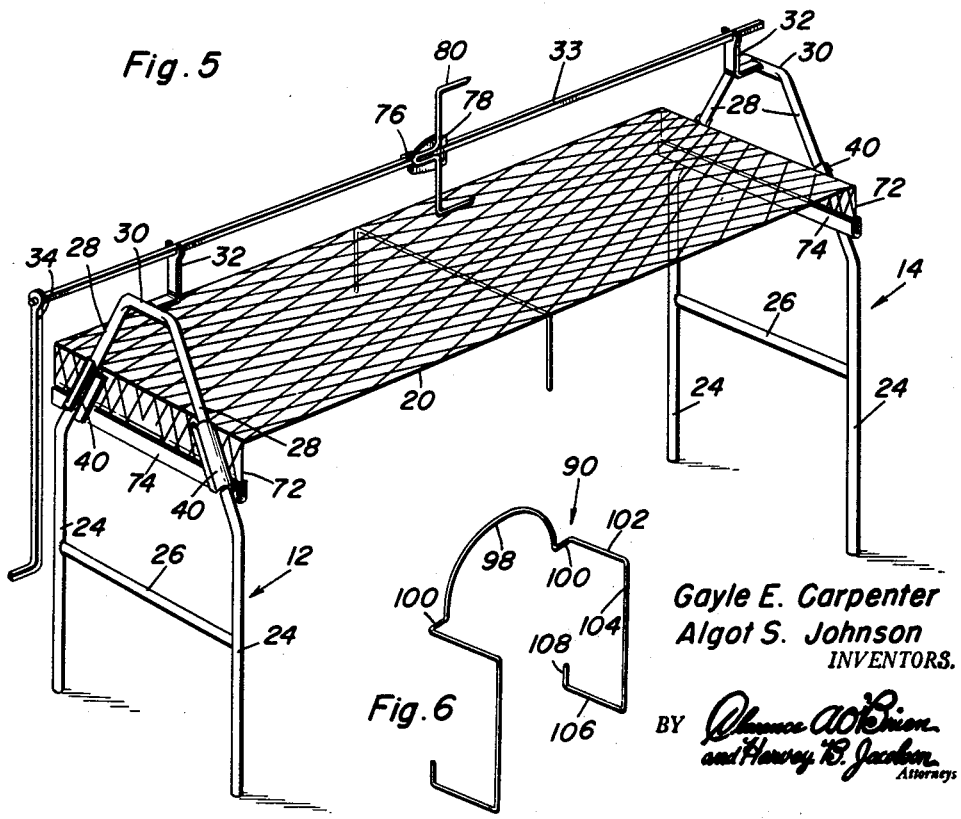
Fig. 5
Fig. 6
Gayle E. Carpenter
Algot S. Johnson
INVENTORS.

May 31, 1960   G. E. CARPENTER ET AL   2,938,450
OUTDOOR COOKING APPARATUS
Filed April 12, 1955   3 Sheets-Sheet 3

Gayle E. Carpenter
Algot S. Johnson
INVENTORS.

United States Patent Office 2,938,450
Patented May 31, 1960

2,938,450

OUTDOOR COOKING APPARATUS

Gayle E. Carpenter, Prior Lake, Minn., and Algot S. Johnson, 927 Bellow St., St. Paul, Minn.

Filed Apr. 12, 1955, Ser. No. 500,826

4 Claims. (Cl. 99—427)

The present invention relates to an outdoor cooking apparatus and more particularly relates to a combination portable grill, rotisserie and spit supporting structure.

The primary object of the invention is to provide a portable outdoor cooking apparatus of the above described character which is exceedingly versatile in its utility, being adaptable for use both over an open fire and as a cooking unit in its own right, being adaptable to carry a spit, rotisserie, fire or fuel box, fire screen and grill plate, as necessitated by the occasion.

An important object of the invention is to provide a portable cooking apparatus of the foregoing character which is at the same time collapsible so that all the elements thereof may be carried by a simple carrying handle in a single packaging arrangement.

Another extremely important object of the invention is in the provision of a portable cooking apparatus comprising a pair of spaced, upstanding, end supporting frames which are detachably connected to one another through the medium of connecting means, which connecting means may constitute any one of a fire screen, a fuel or charcoal box or a grill plate and wherein the tops of the supporting frames are provided with supporting structures for carrying a spit above the connecting means.

A further object of the invention, ancillary to the preceding object, is in the provision of a sectional drum to be carried by the spit forming a portion of the cooking apparatus whereby the drum may serve as a rotisserie for roasting weiners or the like and rotated upon rotation of the spit.

Another object of the invention is in the provision of a sectional drum for mounting on a spit wherein the sections of the drum are each provided with a portion of an axial sleeve for the drum whereby the drum sections when mounted on the spit are retained in abutment with each other in a novel and secure manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the portable cooking apparatus with the charcoal box, spit and rotary drum in place thereon;

Figure 2 is an end view of the apparatus of Figure 1;

Figure 3 is an exploded perspective view of the spit and sectional drum constituting a portion of the cooking apparatus;

Figure 4 is an enlarged side elevational view of one end portion of the drum in cross-section disclosing the mounting of the same on the spit of the apparatus;

Figure 5 is a perspective view of the cooking apparatus wherein the connecting means between the end frames of the apparatus constitutes a fire screen and the spit is provided with tines or forks for supporting elements to be cooked thereon;

Figure 6 is a perspective view of a carrying handle for the cooking apparatus when the same is in collapsed position;

Figure 7:
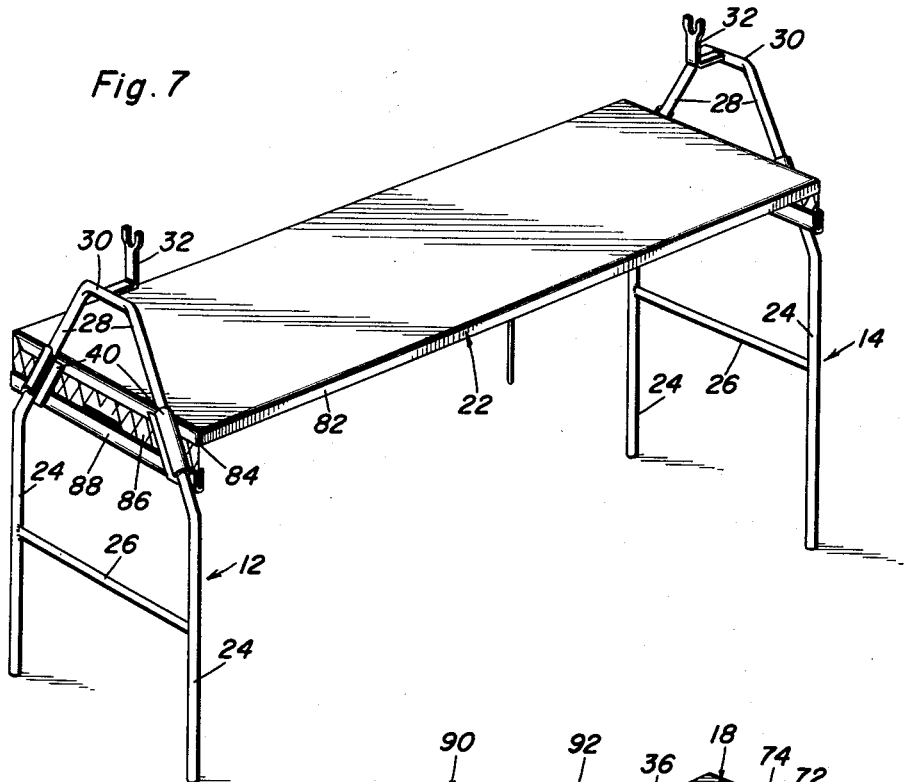
Figure 7 is a perspective view of the cooking apparatus wherein the connecting means between the end frames of the apparatus constitutes a grill plate.

Referring now to the drawings in detail, the cooking apparatus is designated in its entirety by the numeral 10. The apparatus consists essentially of a pair of upstanding, supporting end frames 12 and 14 interconnected by a connecting means 16 which connecting means may constitute a charcoal box 18, a fire screen 20 or a grill plate 22, as shown respectively, in Figures 1, 5 and 7.

The end frames 12 and 14 are identical to one another and are in essence modified A-frames consisting of spaced legs 24 having parallel lower portions interconnected by a brace member 26 and having the upper portions 28 thereof converging toward the top of the frame. The top of the frame consists of a short connecting bar or bight portion 30 which is substantially horizontally extending.

The spit supporting bracket 32 is attached to each of the bight portions 30 of the supporting frames 12 and 14, respectively, for supporting an elongated spit 33 rotatably thereon in a manner such that the spit 33 is disposed considerably above the connecting means 16 connecting the frame sections 12 and 14. One end of the spit 33 is provided with a turning crank or handle 34.

The connecting means 18 consists of an elongated, rectangular fire or charcoal box having a bottom, side walls 36 and end walls 38. Each of the end walls 38 is provided with spaced, U-shaped clips or the like 40 which converge upwardly toward one another at generally the same angle of convergence as the upper end portions 28 of the frames 12 and 14, whereby they may be slipped over the converging upper end portions of the frames to connect the frames.

In order to provide proper draft for the charcoal box 18, the bottom 42 thereof is provided with suitable perforations 44 at selected intervals, as will be noted from an examination of Figure 4.

The spit 33 is adapted to support and as shown in Figures 1, 2 and 4, does support a reticulated drum 46 thereon.

The drum 46 is composed of first and second semi-cylindrical sections 48 and 50, respectively, which are separable from one another.

The drum 46 is provided with an axial sleeve 52 therethrough by means of which the same is non-rotatably mounted on the spit 33 thereby turning of the spit 33 by the crank 34 also serves to turn the drum 46.

The section 50 of the drum carries one portion of the sleeve 52 and the section 48 of the drum carries a second portion of the sleeve.

The portion of the sleeve 52 carried by the section 50 of the drum constitutes an elongated tube 54 having the end portions 56 and 58 thereof projecting beyond the ends of the section. The end portion 56 is provided with a non-circular bore therethrough corresponding to the non-circular construction of the spit whereby the same will be non-rotatably received on the spit.

The second end portion 58 of the tube 54 is in the form of an elongated trough formed by longitudinally slitting the sleeve and removing a portion thereof therefrom.

The second portion of the sleeve 52 which mounts the drum on the spit 33 is carried by the first section 48 of the drum and constitutes a trough-shaped member 60 which is complementary to the trough-shaped section 58 of the tube 50, which section projects beyond one end of the drum section 48. The end portion of the trough 60 is in the form of a short tube or collar section 62.

The drum sections 48 and 50 are placed in juxtaposition with one another so that the trough section 60 rests upon the complementary trough portion 58 of the tube 54 with the tube collar 62 abutting the end of the trough section 58 so that the tube 54, trough portion 58, trough section 60 and tube collar 62 constitute the drum sleeve.

The end wall of the drum section 48 opposite the end wall thereof carrying the trough section 60 is provided with a latching element 64 in the form of a unitary wire member having hooked ends 68 extending above the drum section.

The complementary end of the drum section 50 is provided with apertures 70 through which the hooked portions 68 extend to clamp the drum sections to one another for resistance to sliding movement with respect to one another.

Obviously, by virtue of the construction of the drum 46, the same is readily discerptible from the spit 33 and attachable to the spit 33. Likewise, by the attachment of the sections of the drum to one another and their attachment to the spit 33, the drum sections are held against pulling apart from abutment with one another by the formation of the sleeve 52 on the opposite drum sections. The hooks 68 of the latching member 64, of course, prevent endwise slippage in one direction of the drums relative to one another. The abutment of the tubular collar section 62 with the trough portion 58 prevents shearing movement of the drum sections relative to one another in the opposite direction.

The connecting means 20 disclosed in Figure 5 consists essentially of an elongated, reticulated plate having downturned ends 72 having reinforcing channels 74 at each of the ends thereof.

U-shaped clamping elements 40 are secured to the outer surfaces of the downturned end portions 72 and are disposed at the same angle of convergence as the angle of convergence of the upper end portions 28 of the end frames 12 and 14. Thus, the connecting means 20, as the connecting means 18 constituting the charcoal box previously described, may be slipped over the converging portions of the legs 24 to secure the frames 12 and 14 detachably to one another.

Also, as shown in this figure, the spit 33 is provided with a short sleeve or collar section 76 carrying a plate 78 which carries tine forks 80 for supporting marshmallows, wieners or the like when it is desired to roast them over an open fire, the screen 20 serving as a fire screen.

The grill plate 22 constituting the other connecting means constitutes an elongated, flat, imperforate plate having downturned side flanges 82 and downturned end flanges 84 from which depend reticulated sections 86 having a reinforcing channel 88 at the free ends thereof. On these downturned end flanges 84, reticulated portions 86 and reinforcing channels 88 of each end of the grill plate 22 are mounted U-shaped clamping elements 40 of the same angle of convergence as the upper portions of the legs 24 of the frames 12 and 14, as previously described, so that the grill plate 22 may detachably interconnect the frames 12 and 14 to one another in the manner of the previously described connecting means.

Figure 8:
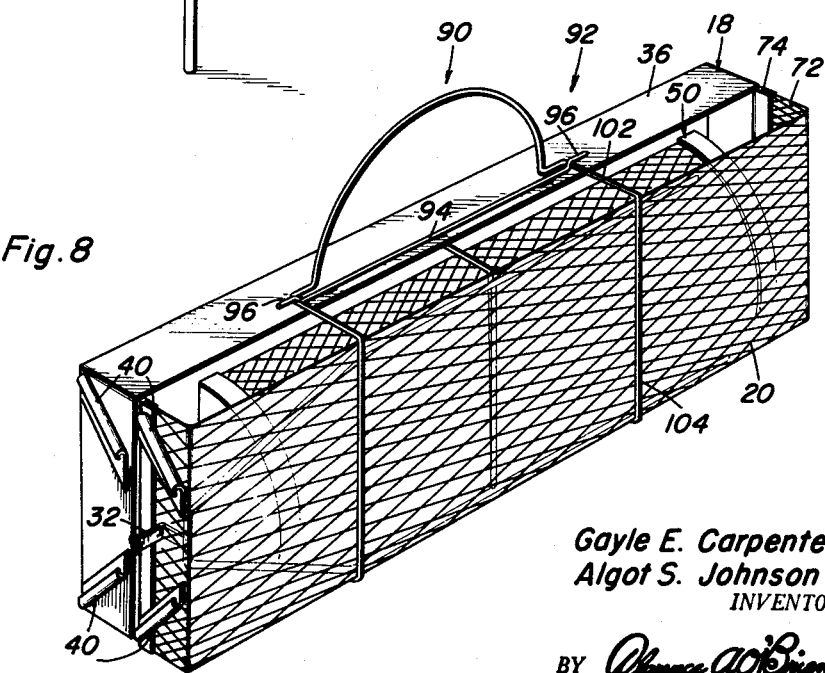
Figure 8 is a perspective view of the complete apparatus including all the attachments therefor collapsed into a single package held together by the carrying handle.

When it is desired to collapse the entire cooking apparatus and all its attachments into a single package, a carrying handle 90 is provided, as shown in Figure 6, which operates to hold the entire assembly together in a unitary package, as shown in Figure 8.

To pack the structure into a unitary package, as designated by the numeral 92 in Figure 8, one of the sides 36 of the firebox 18 is provided with an elongated longitudinally extending wire member 94 having outwardly laterally spaced end portions 96. Reticulated fire screen 20 has the downturned ends thereof plated in abutment with the ends of the charcoal box 18. The drum 46 is reduced to its sections 48 and 50 which are housed within the space formed within the charcoal box 18 and by the wall of the reticulated screen 20. Also, spit 33 has the crank 34 detached therefrom, and these members as well as the tine supporting structure 76 are disposed within the space formed by the fuel box 18 and the reticulated screen 20.

The carrying handle 90 consists of an elongated one-piece wire member having an arcuate bight portion 98 having laterally extending end portions 100 which have projecting forwardly therefrom flat sections 102 which lead to vertically extending portions 104, the lower ends of which are rebent in a direction parallel to the portions 102 and having the free end portions 108 thereof extending upwardly parallel to the portions 104.

The carrying handle is attached to the side 36 of the charcoal, fuel or fire box 18 underneath the laterally spaced wire end sections 96. The forwardly extending flat portions 102 extend forwardly to the surface of the reticulated screen 20 and then the downwardly extending portions 104 embrace the surface of the reticulated screen 20 and extend transversely thereacross, the rearwardly turned lower end portions 106 of the carrying handle extend rearwardly to embrace the opposite side wall 36 of the firebox 18 and the upturned end portions 108 rest against the bottom 42 of the firebox so that the entire assembly, by virtue of slipping the carrying handle 90 in place, may be carried as a self-contained unit.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A portable outdoor cooking apparatus comprising a pair of spaced supporting frames, means connecting said frames to one another intermediate their tops and bottoms, said frames having their side edges converging toward one another as they approach the tops of the frames, said connecting means having attaching elements on the ends thereof, the attaching elements on each end of said connecting means converging toward one another at approximately the same angle of convergence as said frame side edges and being attached to said converging frame side edges, spit supporting members carried by said frames for supporting a spit above said connecting means, a spit carried by said supporting members and extending between said frames, a drum carried by said spit, said drum comprising a pair of semi-cylindrical sections, each of said sections having a portion of an axial sleeve extending therealong non-rotatably embracing said spit, and means attaching said sections to one another to prevent relative sliding movement of the sections.

2. A portable outdoor cooking apparatus comprising a pair of spaced supporting frames, means connecting said frames to one another intermediate their tops and bottoms, said frames having their side edges converging toward one another as they approach the tops of the frames, said connecting means having attaching elements on the ends thereof, the attaching elements on each end of said connecting means convering toward one another at approximately the same angle of convergence as said frame side edges and being attached to said converging frame side edges, spit supporting members carried by said frames for supporting a spit above said connecting means, a spit carried by said supporting members and extending between said frames, a drum carried by said spit, said drum comprising a pair of semi-cylindrical sections, each of said sections having a portion of an axial sleeve extending therealong non-rotatably embracing said spit, and means attaching said sections to one another to prevent relative sliding movement of the sections, one of said portions comprising an elongated tube extending between and projecting beyond the ends of one of said sections, one of the projecting ends of said tube forming a longitudinal trough, the other of said portions comprising a longitudinal trough projecting outwardly beyond one end of the other drum section and terminating in a tubular free end, said troughs interfitting with one another embracing the spit between said tube and tubular free end whereby the sleeve assists in maintaining the drum sections in abutment with one another on the spit.

3. A portable outdoor cooking apparatus comprising a pair of spaced supporting frames, means connecting said frames to one another intermediate their tops and bottoms, spit supporting members carried by said frames for supporting a spit above said connecting means, a spit carried by said supporting members and extending between said frames, a drum carried by said spit, said drum comprising a pair of semi-cylindrical sections, each of said sections having a portion of an axial sleeve extending therealong non-rotatably embracing said spit, and means attaching said sections to one another to prevent relative sliding movement of the sections, one of said portions comprising an elongated tube extending between and projecting beyond the ends of one of said sections, one of the projecting ends of said tube forming a longitudinal trough, the other of said portions comprising a longitudinal trough projecting outwardly beyond one end of the other drum section and terminating in a tubular free end, said troughs interfitting with one another embracing the spit between said tube and tubular free end whereby the sleeve assists in maintaining the drum sections in abutment with one another on the spit.

4. A cooking drum adapted to be mounted on a spit, said drum comprising a pair of sections, each of said sections including a portion of an axial sleeve for said drum for embracing a spit, one of said portions comprising an elongated tube extending between and projecting beyond the ends of one of said sections, one of the projecting ends of said tube forming a longitudinal trough, the other of said portions comprising a longitudinal trough projecting outwardly beyond one end of the other drum section and terminating in a tubular free end, said troughs interfitting with one another embracing a spit between said tube and tubular free end whereby the sleeve assists in maintaining the drum sections in abutment with one another on a spit.

References Cited in the file of this patent

UNITED STATES PATENTS

| Number | Name | Date |
|---|---|---|
| 983,549 | Greiner | Feb. 7, 1911 |
| 1,292,031 | Parker | Jan. 21, 1919 |
| 2,048,769 | Anderson | July 28, 1936 |
| 2,157,500 | Sarsfield et al. | May 9, 1939 |
| 2,411,332 | Orchard | Nov. 19, 1946 |
| 2,691,368 | Hood | Oct. 12, 1954 |
| 2,696,163 | Galley | Dec. 7, 1954 |
| 2,760,428 | Boyajian | Aug. 28, 1956 |